(12) United States Patent
Caillot et al.

(10) Patent No.: US 10,538,222 B2
(45) Date of Patent: Jan. 21, 2020

(54) CASING FOR A WINDSCREEN WIPER DRIVE ROD

(71) Applicant: Valeo Systèmes d'Essuyage, Le Mesnil Saint Denis (FR)

(72) Inventors: Gérald Caillot, Cernay La Ville (FR); Jean-Michel Jarasson, Le Mesnil Saint Denis (FR); Vincent Izabel, Chilly Mazarin (FR); Mark Antony Pattison, Farmington Hills, MI (US)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 104 days.

(21) Appl. No.: 15/402,286

(22) Filed: Jan. 10, 2017

(65) Prior Publication Data

US 2017/0197590 A1    Jul. 13, 2017

(30) Foreign Application Priority Data

Jan. 11, 2016  (EP) .................................... 16305016

(51) Int. Cl.
*B60S 1/08*  (2006.01)
*B60S 1/52*  (2006.01)
*B60S 1/34*  (2006.01)

(52) U.S. Cl.
CPC ........... *B60S 1/3425* (2013.01); *B60S 1/3415* (2013.01); *B60S 1/3484* (2013.01); *B60S 1/08* (2013.01); *B60S 1/52* (2013.01)

(58) Field of Classification Search
CPC ........ B60S 1/08; B60S 1/3425; B60S 1/3415; B60S 1/52

USPC .......................... 15/250.46, 250.47, 250.361
See application file for complete search history.

(56) References Cited

U.S. PATENT DOCUMENTS

| 3,512,205 | A * | 5/1970 | Riester | B60S 1/14 15/250.34 |
| 6,336,243 | B1 * | 1/2002 | Charng | B60S 1/3806 15/250.201 |
| 6,481,044 | B1 * | 11/2002 | Journee | B60S 1/4038 15/250.32 |
| 6,581,238 | B1 * | 6/2003 | Sevellec | B60S 1/34 15/250.34 |
| 6,654,983 | B1 * | 12/2003 | Raynaud | B60S 1/4038 15/250.32 |
| 6,658,691 | B2 * | 12/2003 | Muramatsu | B60S 1/3456 15/250.19 |

(Continued)

FOREIGN PATENT DOCUMENTS

| JP | 2002067886 A | 3/2002 |
| WO | 2014208541 A1 | 12/2014 |

OTHER PUBLICATIONS

Second Office Action in corresponding Chinese Application No. 201710238882.9, dated May 17, 2019 (13 pages).

*Primary Examiner* — Michael D Jennings
(74) *Attorney, Agent, or Firm* — Osha Liang LLP

(57) ABSTRACT

Casing (20') for a windscreen wiper drive rod, in particular of a motor vehicle, said casing being configured to cover at least a portion of said drive rod and comprising means for fixing to said drive rod and/or to at least one element (42) linked to said drive rod, characterised in that it further comprises support and guiding means (70) which are configured to cooperate with at least one electric cable (63) and/or at least one fluid line (64) of said windscreen wiper.

9 Claims, 3 Drawing Sheets

(56) References Cited

U.S. PATENT DOCUMENTS

| | | | | |
|---|---|---|---|---|
| 8,205,292 | B1* | 6/2012 | Thielen | B60S 1/3484 15/250.34 |
| 10,035,496 | B2* | 7/2018 | Caillot | B60S 1/32 |
| 2004/0060143 | A1* | 4/2004 | Shuen | B60S 1/0408 15/250.201 |
| 2007/0136975 | A1* | 6/2007 | Van De Rovaart | B60S 1/34 15/256.5 |
| 2008/0134455 | A1* | 6/2008 | Kinnaert | B60S 1/3867 15/250.32 |
| 2012/0043237 | A1* | 2/2012 | Hun | B65D 5/0209 206/349 |
| 2014/0182076 | A1* | 7/2014 | Moll | B60S 1/3481 15/250.351 |
| 2015/0040337 | A1* | 2/2015 | Espinasse | B60S 1/3891 15/250.38 |
| 2016/0121853 | A1* | 5/2016 | Uchiyama | B60S 1/522 15/250.04 |

* cited by examiner

CASING FOR A WINDSCREEN WIPER DRIVE ROD

TECHNICAL FIELD

The present invention relates in particular to a casing for a windscreen wiper drive rod, in particular of a motor vehicle.

PRIOR ART

A motor vehicle is conventionally provided with windscreen wipers for washing the windscreen and preventing the view the driver has of his surroundings from being impaired. These windscreen wipers generally comprise a drive arm, which performs an angular back-and-forth movement, and elongate wiper blades, which in turn carry scraping blade rubbers made of a resilient material. These blade rubbers rub against the windscreen and clear the water, removing it from the field of vision of the driver. The blades are either, in a conventional version, in the form of articulated clamps which hold the scraping blade rubber in a plurality of discrete locations, giving it a bowed shape which allows it to follow any curvature of the windscreen, or, in a more recent version known as a "flat blade", in the form of a semi-rigid assembly which holds the scraping blade rubber over the entire length thereof by way of one or more bending splines which make it possible to apply the wiper to the windscreen without having to use clamps.

In both solutions, the blade is attached to the drive arm by a connection system comprising a connector and an adapter. The connecter is a component which is rigidly connected to the blade and which is generally crimped directly onto the scraping blade rubber or the "flat blade", whilst the adapter is rigidly connected to the arm. The adapter is an intermediate component which makes it possible to link and fix the connecter to the drive arm. It is generally configured to engage in a head or end part in the form of a clevis of the drive arm.

The drive arm is intended to be driven by a motor so as to perform an angular back-and-forth movement. The end of the arm opposite the end pad thereof is connected to an output shaft of the motor via a drive rod. A drive rod is a rigid component of an elongate general shape, a first longitudinal end of which is linked to the output shaft of the motor and a second, opposite end of which generally comprises a pin for linking and articulating the arm in such a way that it can be pivoted with respect to the drive rod. The articulation pin of the arm is substantially parallel to the plane of the windscreen, making it possible to move the arm taking it away from the windscreen, this being necessary during a maintenance operation so as to check the condition of the blade and to replace it if necessary in case of wear.

The first end of the drive rod may be directly linked to the output shaft of the motor or of a geared motor if the motor is associated with a reduction gear. This applies in particular to the wiping device (comprising the windscreen wiper and the drive rod) located on the driver side of the vehicle. In a variant, the first and of the drive rod may be linked to the output shaft of the motor or geared motor via a connecting rod. A further connecting rod then links a central portion of the drive rod to a portion of the vehicle. This applies for example to the wiping device (comprising the windscreen wiper and the drive rod) located on the passenger side of the vehicle.

The drive rod of a windscreen wiper may be covered by a casing so as to improve the aesthetics of the assembly. A drive rod casing is generally a non-structural component which is configured to cover the drive rod and may therefore merely have an aesthetic purpose.

It is known to provide a windscreen wiper with heating means and/or fluid spraying means, in particular for window-cleaning liquid. These means require a supply. The heating means are generally connected via an electric cable to an electric power source located beneath the bonnet of the vehicle. The spraying means are generally linked via a fluid line to a pump and to a reservoir, likewise located beneath the bonnet of the vehicle. Each line and/or each cable of a windscreen wiper extends along the arm of the windscreen wiper and generally comprises a U-shaped curved portion in the region of the drive rod.

It has been found that this U-shaped curved portion is subjected to stress and deformed when the windscreen wiper is used, and this can lead to deterioration of the line or cable or even to the supply to the spraying or heating means of the windscreen wiper being lost.

The invention proposes a simple, effective and cost-effective solution to this problem.

DESCRIPTION OF THE INVENTION

For this purpose, the invention proposes a casing for a windscreen wiper drive rod, in particular of a motor vehicle, said casing being configured to cover at least a portion of said drive rod and comprising means for fixing to said drive rod and/or to at least one element linked to said drive rod, characterised in that it further comprises support and guiding means, preferably projecting, which are configured to cooperate with at least one electric cable and/or at least one fluid line of said windscreen wiper.

The invention thus makes it possible to guide the cable and/or the line by means of the drive rod casing, in particular during movements of the windscreen wiper. The means of the casing may in particular guide defamations and/or movements of the cable and/or the line. By contrast with the prior art, in this case the casing therefore has a guidance function in addition to the aesthetic function thereof. As stated above, the casing is a relatively simple component, and adding the aforementioned means should not make it more complex to manufacture, and removes the need to provide these means elsewhere, for example on the drive rod, which is a solid component and is more expensive to produce.

The casing according to the invention may comprise one or more of the following features, alone or in combination with one another:

- the casing comprises detachable means for fixing to said drive rod and/or to said at least one element linked to said drive rod;
- said fixing means comprise fixing means by resilient detent;
- said fixing means comprise fixing means by engagement and/or interlocking;
- the casing comprises a body having a generally U-shaped cross section, said body comprising two side walls interlinked by an upper wall;
- said support and guiding means comprise at least one rib and for example two ribs;
- the rib or at least one of said ribs is of a generally curved or rectilinear shape;
- the or each rib is of an elongate shape and comprises a longitudinal support and guiding side face for said at least one electric cable and/or said at least one fluid line;

said support and guiding means are located on an upper or lower surface of the casing;

said support and guiding means are located on a lateral extension of the casing; and said casing is formed as a single component, for example in plastics material, in particular together with said means.

The present invention further relates to an assembly comprising a windscreen wiper drive rod and a casing as disclosed above, in particular of a motor vehicle, said drive rod being of a general elongate shape and comprising a first longitudinal end, configured to be linked to an output shaft of a motor, and a second longitudinal end, configured to be linked to one end of a drive arm of a blade of the windscreen wiper.

Said second longitudinal end may carry a pivot pin of said arm. Said casing may comprise first means for fixing to said pin by engagement and second means for fixing to said drive rod by resilient detest.

The present invention further relates to a wiping device, in particular of a motor vehicle, comprising an assembly as disclosed above and a windscreen wiper, said windscreen wiper comprising a blade and a drive arm of said blade, one end of said arm being linked to said second longitudinal end of the drive rod.

The device may comprise at least one electric cable and/or at least one fluid line, at least a portion of which extends substantially in a plane parallel to a surface of said casing, said support and guiding means being formed projecting therefrom.

The wiping device may be located on a driver side and/or a passenger side of the vehicle.

Finally, the present invention relates to an operating method for a wiping device, in particular of a motor vehicle, comprising a windscreen wiper, a drive rod of said windscreen wiper, and a casing as disclosed above, in which at least one electric cable and/or at least one fluid line of the windscreen wiper is guided by said support and guiding means, in particular during windscreen wiper movements.

DESCRIPTION OF THE DRAWINGS

The invention will be better understood, and further details, features and advantages of the invention will become apparent upon reading the following description given by way of non-limiting example with reference to the accompanying drawings, in which.

DETAILED DESCRIPTION

It should be noted that the drawings disclose the invention in a detailed manner for implementing the invention, and said drawings can naturally be used to better define the invention if necessary.

In the following description, the terms longitudinal and lateral refer to the orientation of the windscreen wiper blade or the drive arm according to the invention. The longitudinal direction corresponds to the primary axis of the blade or arm in which it extends, whilst the lateral orientations correspond to concurrent straight lines, in other words lines which cross the longitudinal direction, in particular perpendicular to the longitudinal axis of the blade or the arm in the plane of rotation thereof. For the longitudinal directions, the terms outer and inner are to be interpreted with respect to the point where the blade is fixed to the arm, the term inner corresponding to the portion where the arm and a half-blade extend, or with respect to the point where the arm is fixed to the vehicle. Finally, the directions denoted as upper or lower correspond to orientations perpendicular to the plane of rotation of the windscreen wiper blade, the term lower including the plane of the windscreen.

Figure 1:
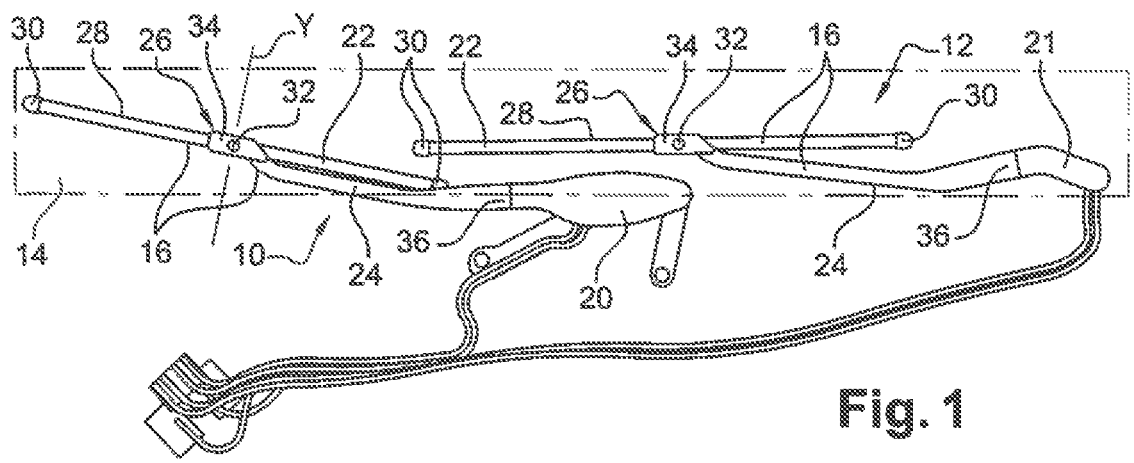
FIGS. 1 and 2 are schematic perspective views of wiping devices, respectively on the driver and passenger sides, of a motor vehicle windscreen.
Figure 2:
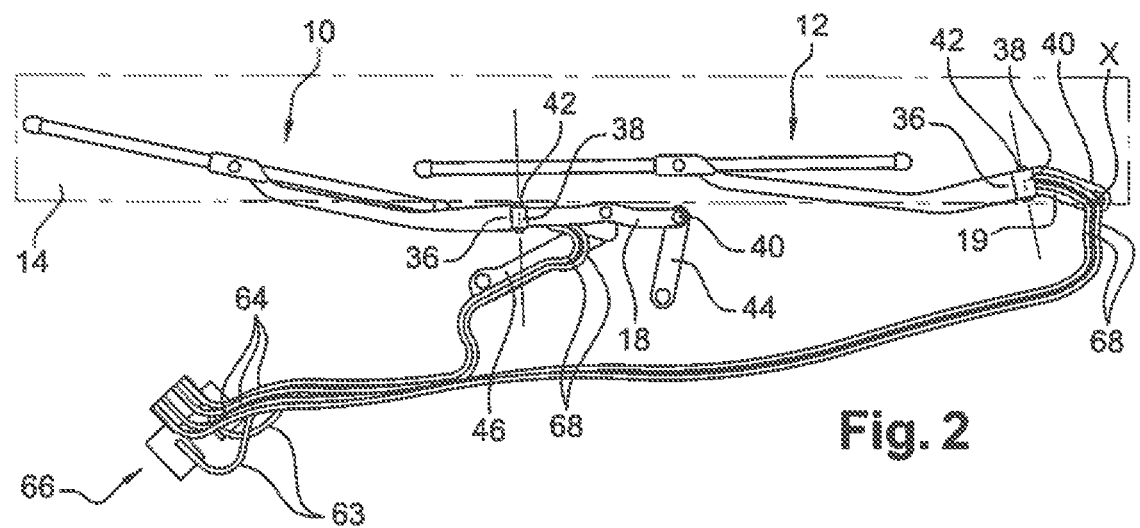

Reference is initially made to FIGS. 1 and 2, which show wiping devices 10, 12 of a vehicle windscreen 14, the windscreen 14 being shown schematically in this case in dotted lines and being viewed from the front of the vehicle.

The wiping device 12 to the right of the drawing is located on the driver side of the vehicle, and the wiping device 10 to the left of the drawing is located in the passenger side of the vehicle.

A wiping device 10, 12 comprises in particular a windscreen wiper 16, a drive rod 19, 19 of the windscreen wiper 16, and a casing 20, 21 on the drive rod 18.

The casings 20, 21 can be seen in FIG. 1, and have been removed in FIG. 2 to make it possible to view the drive rods 18, 19. The casings 20, 21 are in fact easily detached, and are therefore removable.

Each windscreen wiper 16 comprises a blade 22 and a drive arm 24 of the blade 22, the arm 24 and the blade 22 being interlinked by a connection system 26 which makes it possible to articulate the blade to the arm about an axis Y substantially parallel to the plane of the windscreen 14.

The blade 22 is preferably a fiat blade and may comprise a longitudinal body 28, a wiper blade rubber, generally made of rubber, and at least one spline which stiffens the rubber and promotes the application thereof to the windscreen, The body 28 of the blade 22 may comprise an upper aerodynamic deflector for improving the operation of the windscreen wiper, the purpose of this deflector being to improve the pressing of the blade against the windscreen and thus the aerodynamic performance of the windscreen wiper. The blade 22 further comprises end pieces 30 or clips for hooking the rubber and the spline on to the body 28, these end pieces 30 being located at the longitudinal ends of the body 28. The body 28 of the blade 22 carries substantially in the middle thereof an intermediate connector (not shown) which is part of the aforementioned connection system 26.

The connection system 26 further comprises an adapter 32, which is configured to be rigidly fixed to the arm 14 and which is mounted on the connector of the blade 22 to make pivoting possible about the axis Y which is a transverse axis substantially perpendicular to the longitudinal axis of the shaft 22. This pivoting is obtained by using means for articulating the adapter 32, which are configured to cooperate with complementary means of the connector, and conversely to define said articulation axis Y.

The arm 24 is elongate in form and comprises an outer longitudinal end 34 for linking to the blade 22, in which end the adapter 32 is mounted, and an inner longitudinal end 36 for linking to the drive rod 18, 19. The arm is a clevis arm having a U-shaped cross section in this case, but which could be of another type familiar to the person skilled in the art.

In this case, the drive rod 18 of the wiping device 10 is different from the drive rod 19 of the wiping device 12.

Each drive rod 18, 19 is elongate in form and is generally formed as a solid metal component. Each drive rod 18, 19 comprises an outer longitudinal end 38 for linking to the arm 22 and an inner longitudinal end 40 for linking to an output shaft of an electric motor or of a geared motor (which comprises an electric motor associated with a reducing gear). The axis of this output shaft is denoted by reference sign X and is substantially perpendicular to the plane of the windscreen 14. The wiping devices 10, 12 are driven in an angular back-and-forth movement about the axis X, in such a way that the rubber of the blade 22 wipes the windscreen 14 and clears the water and possibly other undesirable elements covering the windscreen 14.

The ends 36 and 38 of the arm 24 and of the corresponding drive rod 18, 19 are interlinked by a pin 42 which extends substantially parallel to the plane of the windscreen 14 and which is substantially perpendicular to the axes of extension of the arm 24 and of the drive rod 18, 19. Each arm 24 is thus articulated to the drive rod 18, 19 thereof about the pin 42, so as to be able to pivot from a position where the rubber of the blade 22 is pressed against the windscreen to a position in which it is moved forwards away from the windscreen, making maintenance operations possible to check the condition of the blade 22 and to replace it if necessary in case of wear.

The end 40 of the drive rod 19 is linked directly to the output shaft of the reducing gear/geared motor whist the end 40 of the drive rod 20 is linked to the output shaft via a connecting rod 44, the ends of which are articulated about axes substantially parallel to the axis X. The drive rod 20 is further linked substantially in the middle thereof to one end of another connecting rod 46, the opposite end of which is linked to the body of the vehicle. The ends of the connecting rod 46 are likewise articulated about axes substantially parallel to the axis X.

In a variant, the end 40 of the drive rod 19 and the end of the connecting rod 44 opposite the drive rod 20 could be linked to a single geared motor via a rod linkage.

In this case, the casing 20 of the drive rod 18 is different from the casing 21 of the drive rod 19.

Figures 3, 4:
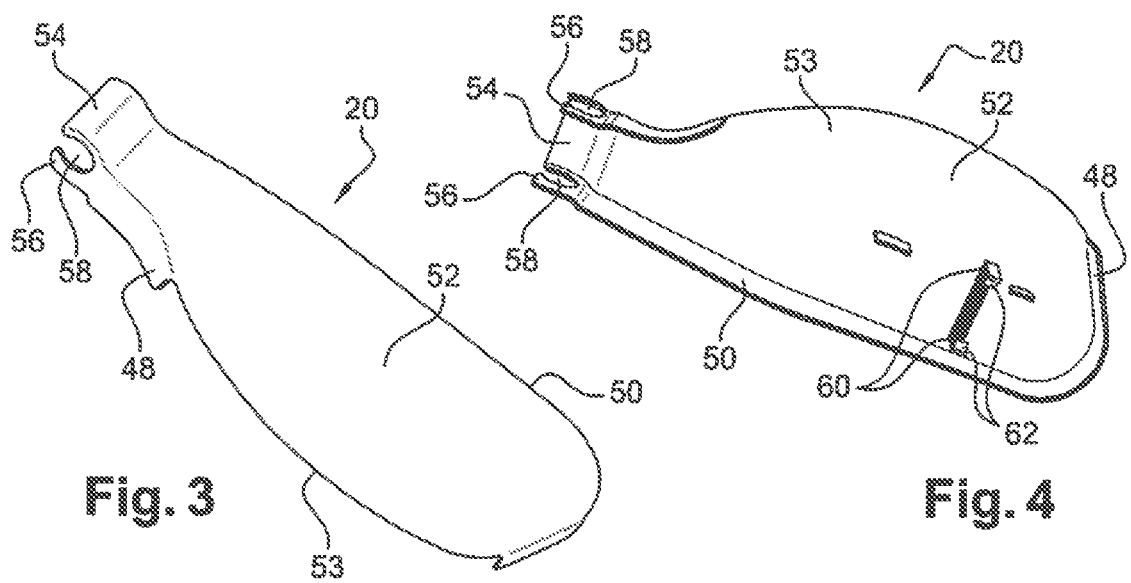
FIG. 3 and 4 are schematic perspective views of a casing for a windscreen wiper drive rod according to the prior art, from above and below respectively.

Each casing 20, 21 is of a general elongate shape and has a substantially U-shaped cross section. It comprises two side walls 48, 50, interlinked at the upper edges thereof by an upper wall 52, as can be seen in FIGS. 3 and 4, which show the casing 20 on a larger scale. Although the following description is given in reference to the casing 20, it is applicable to the casing 21.

The upper wall 52 of the casing 20 is intended to cover the drive rod 18 and the lateral walls 48, 50 thereof are intended to extend over the sides of the drive rod. One 48 of the side walls of the casing 20 may comprise a notch 53 through which the connecting rods 44, 46 passes and moves.

The upper wall 52 is extended outwards by a foot 54 of a generally curved shape about an axis substantially parallel to the pin 42. Each side wall 48, 50 extends outwards by a foot 56, which is penetrated by a substantially circular opening 58. The lower end of each foot 56 defines a hook comprising a tooth at the outer free end thereof, The openings 58 are aligned. The opening 58 in each foot 56 is open towards the outside to make it possible to mount the pin 42 in the opening 58. These elements form means for engagement and/or interlocking with the pin 42.

As can be seen in FIG. 4, the casing 20 further comprises means 60 for fixing to said drive rod 18 by resilient detent. These means 60 are in this case formed projecting on the inner face of the upper well 52 and comprise two feet which can be resiliently deformed, in particular flexurally. The feet 60 are substantially parallel and perpendicular to the wall 52, They are linked by the upper ends thereof to the wall 52 and comprise hooking teeth 62 configured to cooperate with the drive rod 18, at the lower ends thereof.

The casing 20 may be mounted by placing it above the drive rod 18, tilting the outer end thereof towards the pin 42, then engaging this end on the pin 42 in such a way that said pin is received in the openings 58 in the feet 56. The inner end of the casing 20 is thus folded onto the drive rod 18 until the feet 60 of the casing cooperate with the drive rod 18 by resilient detent.

As can be seen in FIG. 1 and 2, each wiping device 10, 12 is provided with (an) electric cable(s) 63 end/or (a) fluid line(s) 64, in particular for window-cleaning liquid. The electric cables 63 make it possible in general to supply the heating means of the arms 24 and/or of the blades 22 with electricity, and the fluid lines 64 make it possible in general to supply liquid spraying means, provided on the blades and/or the arms, with window-cleaning liquid.

The cables 63 and lines 64 extend along the aims 24 of the windscreen wipers as far as the drive rods 18, 19, where they are curved, and subsequently extend beneath the bonnet of the vehicle, where they are connected to the appropriate electrical and fluid connection means 66.

The curved portions 66 of the cables 63 and lines 64 are stressed during the movements of the wiping devices. They are deformed, forming a more or less open U. These stresses can lead to wear and to pinching of the cables 63 and lines 64, and this is not acceptable.

The present invention proposes a solution to this problem by the use of support and guiding means which are provided on the casing and which are configured to cooperate with at least one electric cable and/or at least one fluid line of the windscreen wiper.

Figure 5:
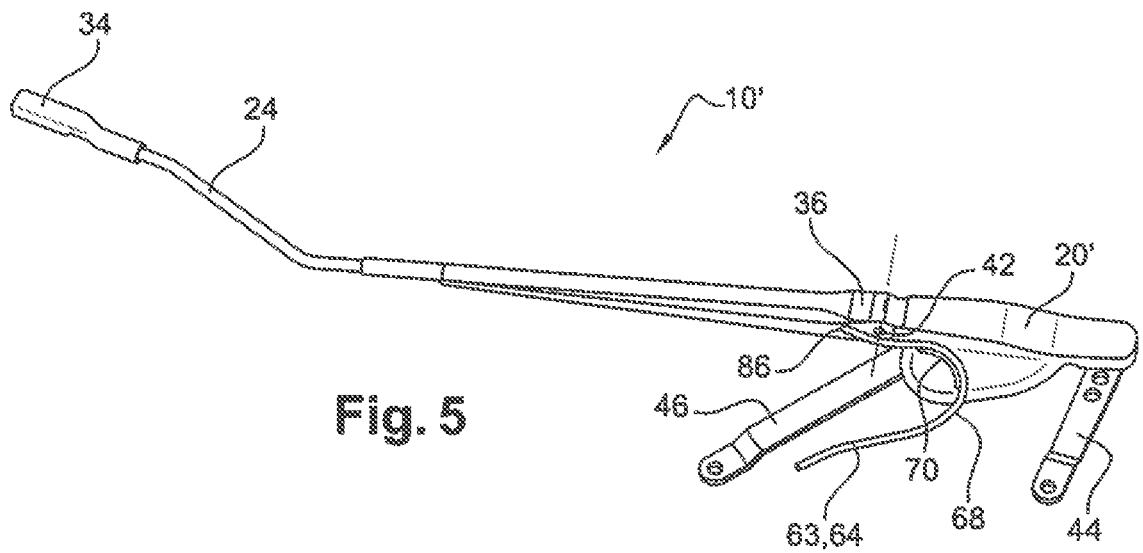
FIG. 5 is a schematic perspective view of a wiping device according to the invention.
Figure 6:
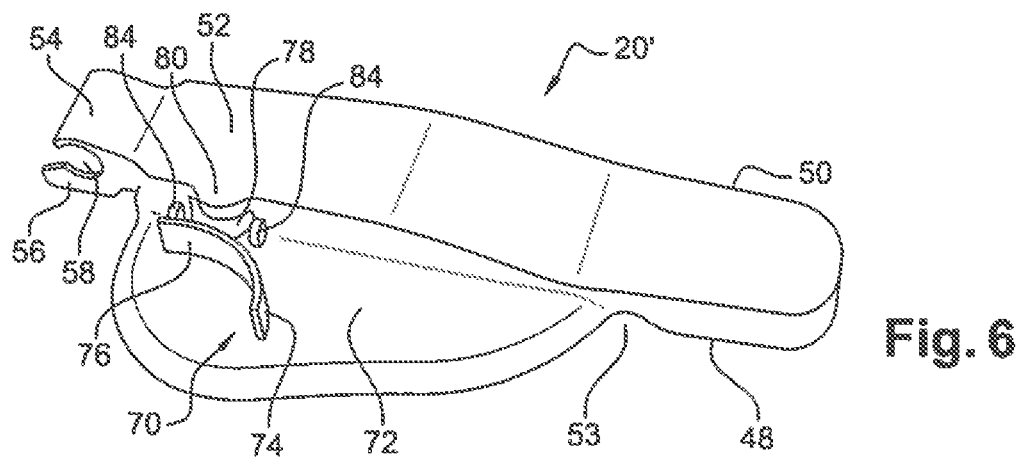
FIGS. 6 and 7 are schematic perspective views of the drive rod casing of the wiping device of FIG. 4, from above and below respectively.
Figure 7:
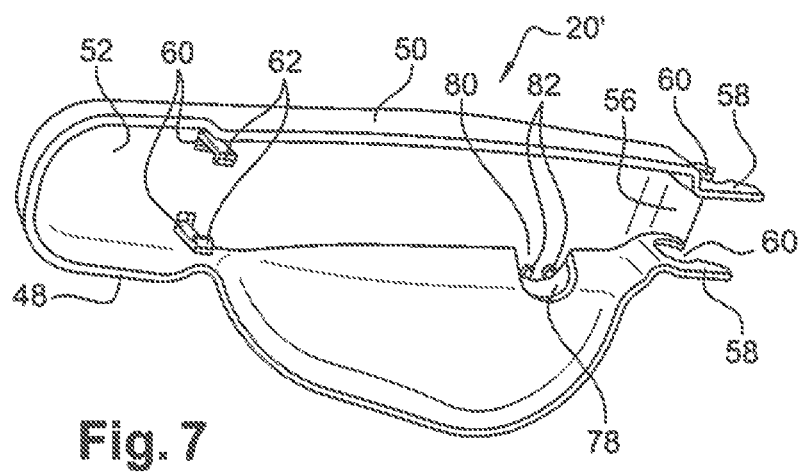
Figure 8:
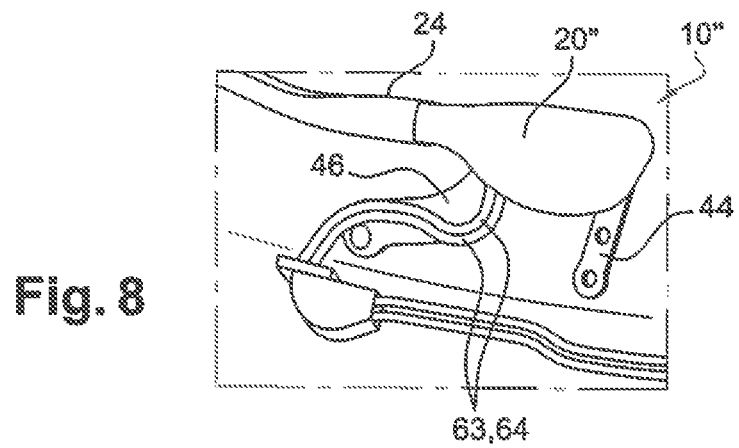
FIGS. 8 and 9 are schematic perspective views of a variant embodiment of a wiping device according to the invention, from above and below respectively.
Figure 9:
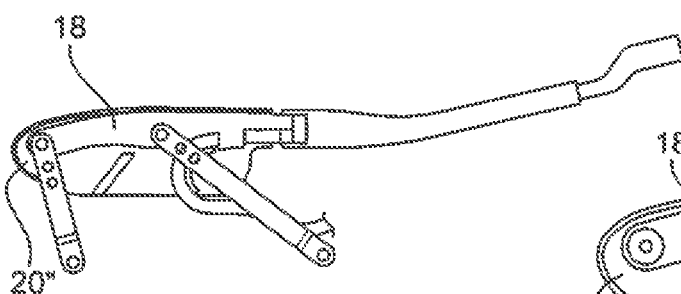
Figure 10:
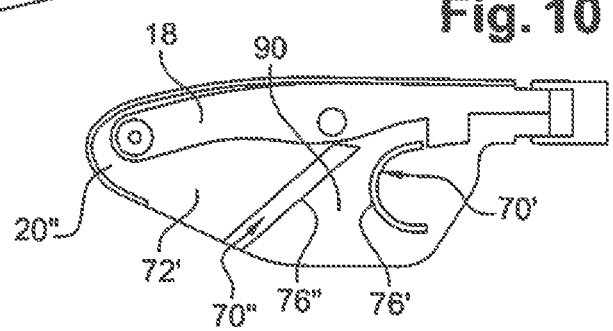
FIG. 10, 11a and 11b are schematic views of the drive rod and casing of the device of FIG. 8 and 9, from below, FIGS. 11a and 11b showing the operating steps of the device.

FIGS. 5 to 7 show a first embodiment of the invention, in which the elements disclosed above are denoted by like reference numerals.

The wiping device 10', in this case of the same type as the wiping device 10 disclosed above, is located on the passenger side of the vehicle. The drive rod of this device cannot be seen in the drawings, but is similar to the drive rod 18 disclosed above.

The casing 20' of the drive rod comprises all of the features disclosed above in relation to FIG. 3 to 4 in particular, and further comprises the following features.

The casing 20' comprises support and guiding means for at least one cable/line 63, 64, which comprise a rib 70 in the example shown.

The rib 70 projects on an upper face 72 of the casing 20'. The rib 70 is of an elongate and curved shape. It comprises two longitudinal side faces, concave 74 and convex 76 respectively, The convex face 78 defines a support and guiding face for the cable/line 63, 64.

In this case, the rib 70 has an angular extension of approximately 90°. In this case, the convex face 76 is orientated towards the upper right-hand corner of the windscreen 14 as seen from the front of the vehicle. In other words, the convex face 76 is orientated somewhat to one side and towards the longitudinal end of the casing 20', opposite the openings 58.

In this case, the rib 70 is located on the upper surface 72 of a lateral extension of the casing 20'. The surface 72 is substantially parallel to and offset, in this case downwards, from the upper face of the wall 52.

A portion of the side wall 48 of the casing 20', from which the lateral extension extends, is penetrated by an opening 78. This opening 78 extends into the lateral extension until it is opposite the rib 70.

The upper wall 52 of the casing 20' comprises at the opening 78 a lateral finger 80 which extends above the opening 78 and the continuation thereof in the extension. This finger 80 has a peripheral edge which extends perpendicular to the peripheral edge of the continuation of the opening in the extension and is of substantially the same shape, in this case curved.

As can be seen in FIG. 7, studs 82, in this case two of them, are provided on the lower face of the finger 80. They project from this face, substantially parallel to each other and perpendicular to this face. They are arranged in succession along a line substantially parallel to the longitudinal axis of the casing 20'.

As can be seen in FIG. 6, studs 84, in this case two of them, are likewise provided at the link between the upper face 72 and the side wall 48, one on each side of the opening 78. They are substantially parallel to each other and perpendicular and are arranged in succession along a line substantially parallel to the longitudinal axis of the casing 20'.

The studs 82, 84 and the finger 80 help guide and retain the cable/line 63, 64 during the movements thereof.

As can be seen in FIG. 5, and as has already been disclosed above, the cable/line 63, 64 extends in part along the arm 24. In this case, it passes through an opening 86 located at the inner end of the arm 24 and subsequently forms a portion 68 which is curved in a U shape, and which rests on the face 76 of the rib 70 and which passes under the finger 80. Advantageously, the cable/line 63, 64 is engaged and pinched by force between the studs 82 on the one hand and the studs 84 on the other hand, to prevent it from sliding on the face 76. During the movement of the device 10' and the use of the windscreen wiper, the curved portion is deformed in that the opening of the U becomes larger. This deformation is guided by the rib 70, which imposes a particular radius of curvature on the portion of the cable/line 63, 64 resting on the face 76.

The following refers to FIG. 8 to 11b, which show another embodiment of the invention.

The basic difference between this embodiment and the previous embodiment is that the support and guiding means are located on a lower face 72' of the casing 20" in this case and comprise two ribs 70', 70" in this case.

hi this case, the ribs 70', 70" are boated on the lower face 72' of the lateral extension of the casing 20".

A first rib 70' is similar to the rib 70 disclosed above, and is elongate and curved in shape. It comprises two longitudinal side faces, concave 74' and convex 76' respectively. The convex face 74' is a support and guiding face of the cable/line 63, 64.

In this case, the rib 70' has an angular extent of approximately 180°. In this case, the convex face 76' is orientated towards the inner end of the casing 20".

The second rib 70" is elongate and rectilinear in form. It comprises two longitudinal side faces, one 76" of which is substantially opposite the face 76' of the rib 70'. In this case, the rib 70" is at an angle to the longitudinal axis of the casing 20" and the longitudinal end thereof located nearest the drive rod 18 is closer to the rib 70' than is the longitudinal end thereof opposite the drive rod. In other words, the ribs 70', 70" define between them a space 90 which is narrower in the vicinity of the drive rod 18.

As can be seen in FIGS. 8, 9, 11a and 11b, the cable/line 63, 64 extends along the arm 24 and a portion of the drive rod 18 before passing into the aforementioned space 90, where it can be held between the ends of the ribs 70', 70" located in the vicinity of the drive rod 18.

Figure 11A:
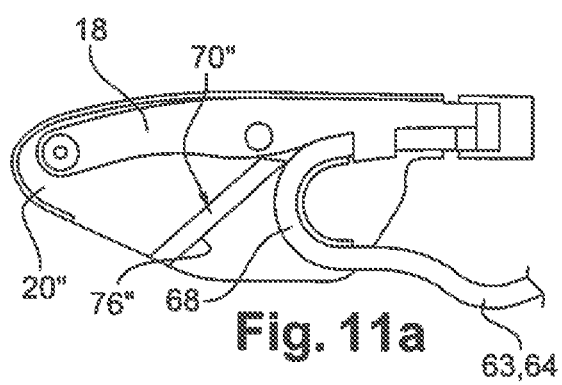
Figure 11B:
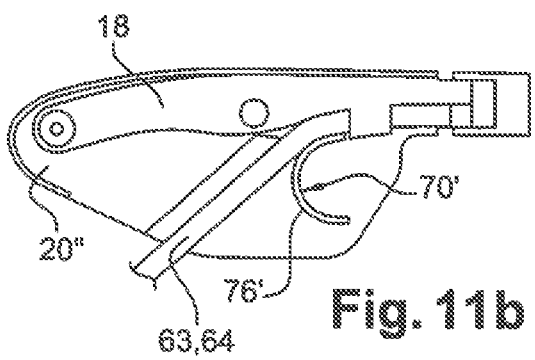

During the movement of the device 10' and the use of the windscreen wiper, the device passes from the configuration shown in FIG. 11a to that shown in FIG. 11b and it can be seen that the curved portion 88 of the cable/line 63, 64 is deformed and moves because the opening of the U becomes larger. This deformation and this movement are guided by the ribs 70, 70" on which the cable/line 63, 64 rests.

Figure 12:
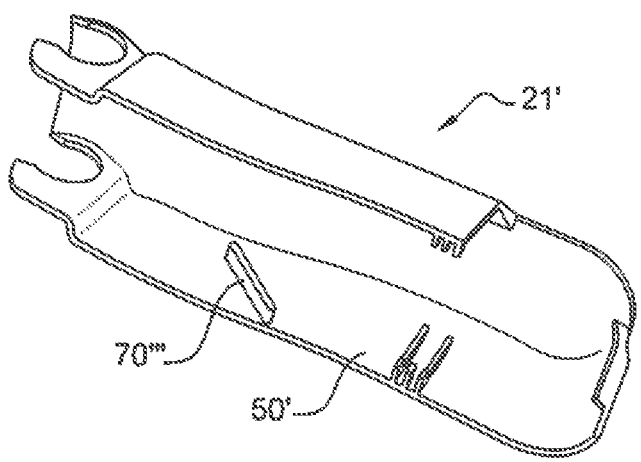
FIG. 12 is a schematic perspective view of a variant embodiment of a drive rod casing according to the invention.

FIG. 12 shows a further embodiment of the invention, in which the casing 21', on which support and guiding means 70''' of the cable/line are provided is a casing of a driver side and not a passenger side wiping device. In this case, the support and guiding means 70''' are shown schematically in dotted lines and are located on the inner face of one of the side walls 50' of the casing. They may comprise at least one rib 70'''. The above description refers in particular to FIGS. 3 and 4, and is applicable to the casing 21'.

The invention claimed is:

1. An assembly comprising:
   a casing for a windscreen wiper drive rod of a motor vehicle; and
   at least one supply line selected from a group consisting of an electric cable and a fluid line of said windscreen wiper,
   said casing being configured to cover at least a portion of said drive rod and comprising:
      means for fixing to at least one of said drive rod or at least one element linked to said drive rod; and
      support and guiding means which cooperate with the at least one supply line selected from a group consisting of the electric cable and the fluid line of said windscreen wiper, the support and guiding means comprising at least one longitudinal rib which are located on an upper or lower surface of the casing,
      wherein said means for fixing comprise at least one selected from a group consisting of fixing means by resilient detent and fixing means by engagement.

2. The assembly according to claim 1, wherein said means for fixing is detachable from said drive rod and said at least one element linked to said drive rod.

3. The assembly according to claim 1, further comprising a body having a generally U-shaped cross section, said body comprising two side walls interlinked by an upper wall.

4. The casing according to claim 1, wherein said support and guiding means are located on a lateral extension of the casing.

5. An assembly comprising:
   a windscreen wiper drive rod of a windscreen wiper of a motor vehicle;
   a casing for said windscreen wiper drive rod; and
   at least one supply line selected from a group consisting of an electric cable and a fluid line of said windscreen wiper,
   said drive rod being generally elongate in form and comprising a first longitudinal end, configured to be linked to an output shaft of a motor, and a second longitudinal end, configured to be linked to one end of a drive arm of a blade of the windscreen wiper, said casing comprising:
  means for fixing to said drive rod and at least one element linked to said drive rod; and
  support and guiding means which cooperate with the at least one supply line selected from a group consisting of the electric cable and the fluid line of said windscreen wiper, the support and guiding means comprising at least one longitudinal rib which are located on an upper or lower surface of the casing,
  wherein said means for fixing comprise at least one selected from a group consisting of fixing means by resilient detent and fixing means by engagement.

6. The assembly according to claim 5, wherein said second longitudinal end carries a pivot pin of said arm, and wherein said casing comprises first means for fixing to said pin by engagement and second means for fixing to said drive rod by resilient detent.

7. The assembly according to claim 5, further comprising a windscreen wiper, said windscreen wiper comprising a blade and an arm for driving said blade, one end of said arm being linked to said second longitudinal end of the drive rod, wherein the assembly forms a wiping device of said motor vehicle.

8. The assembly according to claim 7, at least a portion of the at least one selected from a group consisting of the electric cable and the fluid line extends substantially in a plane parallel to a surface of said casing, said support and guiding means being formed projecting.

9. An assembly comprising:
  a windscreen wiper drive rod of a windscreen wiper of a motor vehicle; and
  a casing for the windscreen wiper drive rod of a windscreen wiper of a motor vehicle, said casing being configured to cover at least a portion of said drive rod and comprising:
    means for fixing to at least one of said drive rod or at least one element linked to said drive rod, wherein said means for fixing comprise at least one selected from a group consisting of fixing means by resilient detent and fixing means by engagement: and
    support and guiding means which cooperate with at least one supply line selected from a group consisting of at least one electric cable and at least one fluid line of said windscreen wiper,
  wherein the fixing means by resilient detent comprises a flexurally deformable foot protruding from an upper wall of the casing and separate from a side wall along a circumference of the upper wall, and
  wherein the fixing means by engagement comprises a pair of feet each penetrated by a substantially circular opening that defines a hook comprising a tooth at an outer free end of each foot, wherein the substantially circular openings are aligned with each other.

* * * * *